Dec. 30, 1969     L. E. SCHARMANN     3,487,253

MECHANICAL DAMPING OF PLANAR VACUUM TUBE GRIDS

Filed Aug. 28, 1967

INVENTOR,
LAWRENCE E. SCHARMANN.

BY *Gordon W. Kerr, Agent*
*Harry M. Saragovitz*
*Edward J. Kelly, Herbert Berl*

ATTORNEYS.

United States Patent Office 3,487,253
Patented Dec. 30, 1969

3,487,253
MECHANICAL DAMPING OF PLANAR VACUUM TUBE GRIDS
Lawrence E. Scharmann, Point Pleasant Beach, N.J., assignor to the United States of America as represented by the Secretary of the Army
Filed Aug. 28, 1967, Ser. No. 664,242
Int. Cl. H01j 1/18, 19/12
U.S. Cl. 313—269                    5 Claims

ABSTRACT OF THE DISCLOSURE

The planar grid comprises an array of coplanar, parallel grid wires stretched across an open framework comprising a ring. In order to dampen mechanical vibration of these wires caused by the tube's operating voltages, one or more untensioned damping wires are woven across the parallel grid wire array. The rubbing action between the vibrating grid wires and the damping wire or wires substantially reduces the amplitude of grid wire vibration. The damping wire or wires are located near at the anti-nodes of grid wire vibration.

---

The invention described herein may be manufactured, used, and licensed by or for the Government for governmental purposes without the payment to me of any royalty thereon.

The present invention relates to planar grids of the type used in metal-ceramic disc type vacuum tubes. These tubes are mainly used in high frequency, low power applications above the frequency range of present-day transistors and usually take the form of triodes, the three electrodes being sandwiched between hollow ceramic discs which form the tube envelope. The grids of such tubes normally comprise an array of coplanar parallel wires tensioned across the opening of a supporting frame usually of annular shape. In some cases the mechanical rigidity of the parallel wire array is enhanced by one or more cross-supports extending perpendicular to the parallel wire array and secured at either end to the supporting frame and also bonded by soldering or brazing to each one of the parallel grid wires. Such grids are disclosed in U.S. Patents 3,238,410 to Beggs, dated Mar. 1, 1966 and 3,069,585 to Katz, dated Dec. 18, 1962. The present inventor has found that tubes with grids of the type discussed above are subject to unwanted or parasitic frequency modulation caused by grid wire motion due to the electrostatic forces set up by the tube operating voltages. This problem was found to be particularly severe when the tube was used as the transmitter, or oscillator, of a pulse radar set in which the tube is periodically set into high peak power oscillation to generate the radar pulses. Frequency components related to the pulse width and/or the pulse repetition rate fall into the mechanical resonant frequency range of the individual grid wires and produce intense vibratory motion. Since the tube envelope is evacuated, there is no air damping of this motion and the internal frictional forces of the wires are the only damping forces present. The use of cross-supports rigidly attached to each grid wire, as described above, merely raises the mechanical resonant frequency of the grid wires, since they are now shorter, however, since the radar pulses are rich in harmonics, the harmonic at the higher mechanical resonant frequency will excite the grid wires. Increasing the tension of the grid wires will have the same result of merely raising the resonant frequency thereof. The entire problem is aggravated by the fact that the grid-cathode spacing in these tubes is often only of the same order of magnitude as the grid wire diameter and thus only a small amplitude of grid wire vibration can result in large changes in grid-to-cathode capacity, which adversely affects the tube operation, or can even result in grid-cathode shorting.

In accordance with the present invention, a planar, parallel-wire grid is provided with one or more free, or untensioned damping cross wires which are loosely woven across the grid wire array and intersects each grid wire at a point of substantial vibratory displacement. This structure has been found to provide a sufficient amount of damping to substantially eliminate the vibration of the grid wires and the deleterious effects thereof on the tube operation.

It is thus an object of the present invention to provide an improved vacuum tube grid of the planar, parallel wire type.

A further object of the invention is to provide a damping means for a planar, parallel-wire grid.

These and other objects of the invention will become apparent from the following detailed description and drawing, in which.

Figure 1:
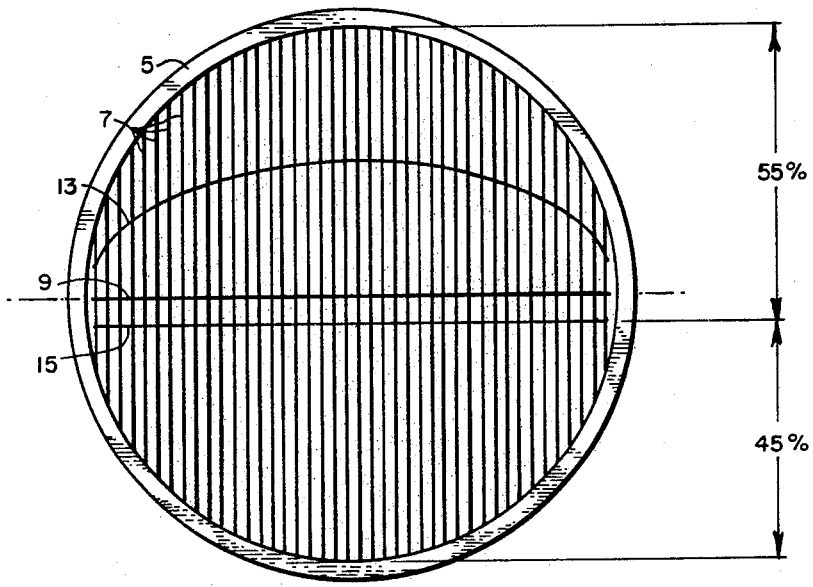
FIGURE 1 is a plan view of an illustrative grid constructed according to the present invention.
Figure 2:
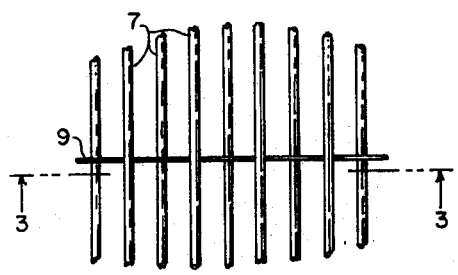
FIGURE 2 is an enlargement of a portion of FIGURE 1

In FIGURE 1, the illustrated grid comprises an array of parallel grid wires 7 tensioned and attached at either end to an annular supporting frame 5. Loosely woven across and perpendicular to the array at the approximate center of each grid wire is a free, or untensioned damping wire 9. In FIGURE 1 the damping wire 9 is shown as free, that is it contacts each grid wire, but it is not attached to the frame 5. It may be convenient in producing this grid to attach the damping wire at one or both ends to the frame to hold it in the proper position. After the assembly of the grid is completed, the damping wire can be cut loose from the frame, or, if there is little or no tension caused by the attachment to the frame, it can be left attached. The enlargement of FIGURE 2 shows how the damping wire 9 is woven through the grid wires. This weaving can be accomplished easily by first attaching every other grid wire to the frame, then laying the damping wire across the half-completed grid array, then attaching the rest of the grid wires over the damping wire. Thus the weaving operation is accomplished without actually threading the damping wire through the completed grid array.

Figure 3:
FIGURE 3 is a side view of the enlargement of FIGURE 2.

Since the damping wire is either free or untensioned, it does not distort, to an appreciable degree, the planar shape of the grid wire array. This can be seen in the side view of FIGURE 3. The loosely woven, untensioned damping wire 9 does not pull downward the grid wires which it passes above nor does it pull upward those grid wires which it passes below. This preservation of the planar shape of the grid is important to the proper functioning of the grid, especially in tubes of small grid-cathode spacing.

Since the damping wire is attached to the grid wires only by the weaving therethrough, any electrostatic or other forces which tend to set the grid wires into vibration will cause relative motion, or rubbing, between each grid wire and the damping wire. This rubbing converts most of the vibratory energy to friction and therefore greatly reduces the amplitude of vibration. The placement of the damping wire 9 perpendicular to the grid wire array and along a diameter of the annular frame places the intersection of this damping wire at the midpoint of each grid wire. The midpoint of each grid wire is the anti-node or point of maximum displacement at its fundamental frequency of vibration, and also at all odd harmonics, and hence the relative motion between each grid wire and the damping wire will be a maximum at this point for these modes of vibration, resulting in maximum damping effect.

In an experimental grid constructed according to this invention, both the grid wires and the damping wire were of tungsten with the damping wire of smaller diameter than of the grid wires. The reduced diameter of the damping wire increases its pliability and permits it to snugly engage each of the grid wires, even though it is substantially untensioned. Other materials such as molybdenum or platinum may also be used as damping wires. The material must be of such nature as to withstand the heat generated both in the assembly of the grid and the heat produced by the cathode in the normal operation of the tube and must not contaminate the tube by deterioration of the vacuum. The damping wires may be of a high strength material such as tungsten or molybdenum, plated or otherwise coated with a material of high coefficient of friction, such as platinum or gold. This would maximize both the strength and damping efficiency of the damping wire.

As stated above, the single diametral damping wire 9 provides damping at the fundamental wire resonant frequencies and at all odd harmonics thereof. In some applications, this single diametral wire will produce a sufficient amount of damping. If, in more severe applications, it is found that the second harmonic of grid wire vibration, which is not damped by the diametral wire 9, adversely affects tube operation, one or more similar wires, properly located, may be used to damp this second harmonic vibration. Such a second harmonic damping wire 13 is shown in FIGURE 1. This damping wire 13 is used in addition to the wire 9 and is similar thereto but is woven through the grid array along a curve such that the wire 13 intersects each grid wire at a point equal to one quarter of the distance along each grid wire's length. This places the wire 13 at the midpoint of the distance between the diametral wire 9 and the end of each grid wire. This point is the anti-node of the second harmonic of each grid wire and this harmonic is thus dampened in the same way that the diametral wire dampens the other frequency components.

Another variation of the invention would be to use a single straight or curved wire slightly offset from the diameter of the frame. Such a chordal wire is illustrated at 15 in FIGURE 1. This wire would intersect each grid wire at points of substantial amplitude of vibration at the fundamental, second harmonic and many of the odd harmonics but not necessarily at the anti-node of any one frequency. Even though the wire 15 is not at an anti-node of any given frequency component, the amount of damping provided by its location in the vicinity of an anti-node can be sufficient to dampen the vibration to an acceptable level. The wire 15 is located at a compromise position relative to the anti-nodes of the various modes or frequencies of vibration, such that a maximum number of such objectionable modes are damped. With such a wire, it is possible to dampen the fundamental plus the second and many of the higher harmonics with a single damping wire. In an experimental grid constructed according to the present invention, the single wire 15 was substantially straight and perpendicular to each grid wire and was offset from the diameter of the frame 5 by 5 percent, that is, the wire 15 intersected the central, or diametral, grid wire 7 at a point equal to 45% of its length measured from one side of the frame and consequently 55% of its length measured from the diametrically opposite side of the frame 5.

While the invention has been described in connection with illustrative embodiments, obvious modifications thereof are possible without departing from the inventive concepts disclosed herein. Accordingly, the invention should be limited only by the scope of the appended claims.

What is claimed is:

1. A planar vacuum tube grid comprising, an array of parallel grid wires stretched across a supporting frame; a pair of mechanical damping wires loosely woven across said array of grid wires, one of said damping wires intersecting each grid wire at its midpoint and said second damping wire intersecting each grid wire at a point equal to one quarter of the distance along each grid wire's length.

2. A planar vacuum tube grid comprising; an array of parallel grid wires stretched across an annular supporting frame; a single chordal damping wire woven across said grid wires, said damping wire being located at a point of substantial vibratory amplitude at the fundamental, and second harmonic of each of said grid wires.

3. The grid of claim 2 wherein said damping wire is offset from the center of said frame by approximately 5%.

4. A planar vacuum tube grid comprising; an array of parallel grid wires stretched across a supporting frame, a pair of untensioned damping wires woven across said array of grid wires, one of said damping wires intersecting each grid wire at the anti-node of its fundamental frequency of vibration and the other of said damping wires intersecting each grid wire at the anti-node of the second harmonic frequency of vibration thereof.

5. The grid of claim 4 wherein said damping wires are coated with a metal selected from the group comprising platinum and gold.

References Cited

UNITED STATES PATENTS

| | | | |
|---|---|---|---|
| 1,930,563 | 10/1933 | Ponte | 313—269 X |
| 2,277,148 | 3/1942 | Ronci | 313—348 |
| 2,757,303 | 7/1956 | Silverman | 313—269 X |
| 2,930,918 | 3/1960 | Coffin | 313—269 X |
| 3,237,044 | 2/1966 | Mitchell | 313—269 |
| 3,304,458 | 2/1967 | Langer et al. | 313—269 |

JOHN W. HUCKERT, Primary Examiner

A. J. JAMES, Assistant Examiner

U.S. Cl. X.R.

313—348